(12) United States Patent
Sugawara et al.

(10) Patent No.: US 10,949,690 B2
(45) Date of Patent: Mar. 16, 2021

(54) DRIVING STATE DETERMINATION DEVICE, DETERMINATION DEVICE, AND DRIVING STATE DETERMINATION METHOD

(71) Applicant: Mitsubishi Electric Corporation, Tokyo (JP)

(72) Inventors: Hisashi Sugawara, Tokyo (JP); Ryosuke Torama, Tokyo (JP); Yudai Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 38 days.

(21) Appl. No.: 16/480,159

(22) PCT Filed: Feb. 15, 2017

(86) PCT No.: PCT/JP2017/005475
§ 371 (c)(1),
(2) Date: Jul. 23, 2019

(87) PCT Pub. No.: WO2018/150485
PCT Pub. Date: Aug. 23, 2018

(65) Prior Publication Data
US 2019/0370579 A1    Dec. 5, 2019

(51) Int. Cl.
*G06K 9/00* (2006.01)
*B60W 40/08* (2012.01)
*G08G 1/16* (2006.01)

(52) U.S. Cl.
CPC ......... *G06K 9/00845* (2013.01); *B60W 40/08* (2013.01); *G06K 9/00248* (2013.01);
(Continued)

(58) Field of Classification Search
CPC ......... G06K 9/00845; G06K 9/900248; G06K 9/00335; G06K 9/00604; G06K 2009/00328; B60W 40/08; G08G 1/16
See application file for complete search history.

(56) References Cited

U.S. PATENT DOCUMENTS 5,729,619 A * 3/1998 Puma .................. B60K 28/063
                                                 382/115
6,571,002 B1* 5/2003 Ogawa ................. G06F 17/153
                                                 382/117
(Continued)

FOREIGN PATENT DOCUMENTS

JP          10044824 A *   2/1998    ............... A61B 5/18
JP        2009-166783 A    7/2009
(Continued)

OTHER PUBLICATIONS

International Search Report issued in PCT/JP2017/005475 (PCT/ISA/210), dated May 23, 2017.

*Primary Examiner* — Manav Seth
(74) *Attorney, Agent, or Firm* — Birch, Stewart, Kolasch & Birch, LLP

(57) ABSTRACT

There are included: a frequency distribution creating unit for referring to the face information detected by the face information detecting unit, and when a preset change occurs in the driver's face, creating a frequency distribution of face information in a preset time section from the face information detected by a face information detecting unit; a mode value calculating unit for calculating a mode value of the face information from the frequency distribution created; and a reference value calculating unit for calculating a reference value indicating a steady state of the driver from the mode value of the face information.

19 Claims, 12 Drawing Sheets

(52) U.S. Cl.
CPC ..... *G06K 9/00335* (2013.01); *G06K 9/00604* (2013.01); *G08G 1/16* (2013.01); *G06K 2009/00328* (2013.01)

(56) References Cited

U.S. PATENT DOCUMENTS

| | | | | |
|---|---|---|---|---|
| 6,633,655 | B1* | 10/2003 | Hong | G06K 9/00255 382/118 |
| 6,717,518 | B1* | 4/2004 | Pirim | A61B 5/1103 340/576 |
| 7,027,621 | B1* | 4/2006 | Prokoski | G06K 9/00248 180/272 |
| 7,460,940 | B2* | 12/2008 | Larsson | G06F 3/012 701/49 |
| 8,224,035 | B2* | 7/2012 | Adachi | G06K 9/00604 382/117 |
| 8,576,081 | B2* | 11/2013 | Hatakeyama | B60W 40/08 340/575 |
| 8,708,884 | B1* | 4/2014 | Smyth | A61M 21/00 600/27 |
| 10,311,289 | B2* | 6/2019 | Sun | G06K 9/00906 |
| 2004/0170304 | A1* | 9/2004 | Haven | A61B 5/163 382/115 |
| 2006/0011399 | A1* | 1/2006 | Brockway | B60T 17/18 180/272 |
| 2011/0216181 | A1* | 9/2011 | Yoda | A61B 5/1103 348/78 |
| 2013/0021462 | A1* | 1/2013 | Kadoya | B60K 28/06 348/78 |
| 2013/0207805 | A1 | 8/2013 | Inada | |
| 2017/0080947 | A1* | 3/2017 | Boos | A61B 5/6893 |
| 2018/0012090 | A1* | 1/2018 | Herbst | G06K 9/6212 |
| 2018/0074497 | A1 | 3/2018 | Tsuji et al. | |
| 2018/0211535 | A1 | 7/2018 | Mizuno et al. | |

FOREIGN PATENT DOCUMENTS

| | | |
|---|---|---|
| JP | 2010-97379 A | 4/2010 |
| JP | 2011-62465 A | 3/2011 |
| JP | 2013-164663 A | 8/2013 |
| JP | 2013-202273 A | 10/2013 |
| JP | 2016-136332 A | 10/2013 |
| JP | 2016-216021 A | 12/2016 |
| JP | 2017-33194 A | 2/2017 |

\* cited by examiner

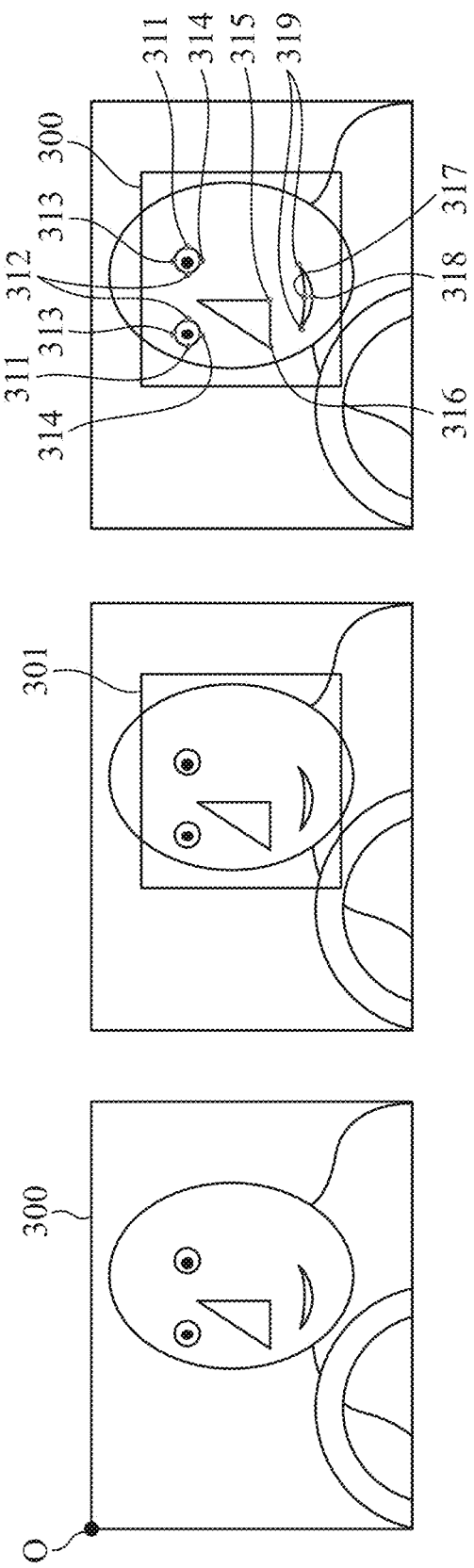

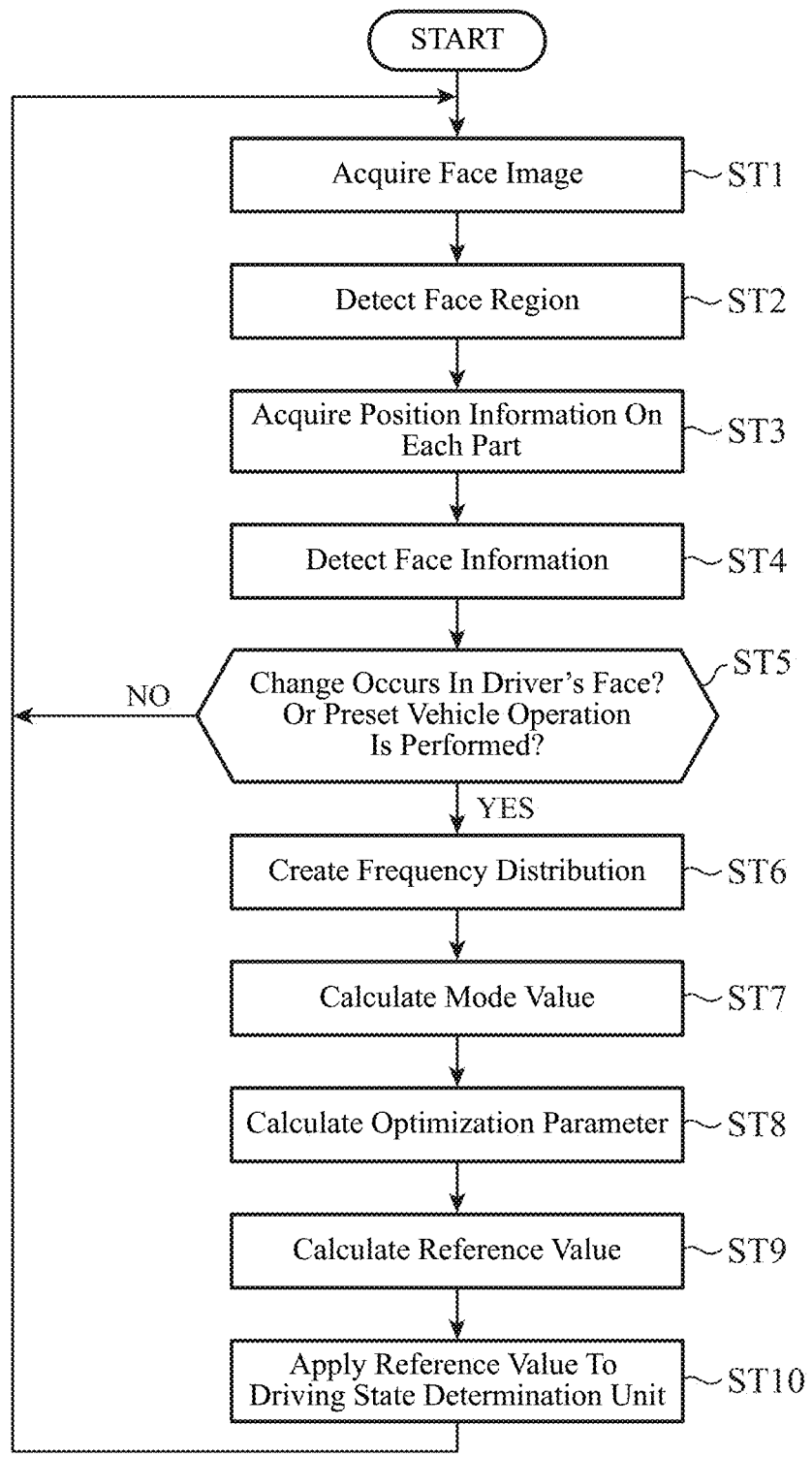

DRIVING STATE DETERMINATION DEVICE, DETERMINATION DEVICE, AND DRIVING STATE DETERMINATION METHOD

TECHNICAL FIELD

The present invention relates to a technique for determining a state of a driver who drives a vehicle.

BACKGROUND ART

As a conventional technique for determining a state of a driver who drives a vehicle, there is a technique in which a face orientation or line of sight of a driver is detected, and when a direction of the line of sight detected deviates from a set normal range, it is determined that the driver is looking aside while driving. However, there are individual differences in a visual field range and a normal range in the visual field range of a driver. In addition, the normal range may vary depending on a posture of the driver and the like. For that reason, it is preferable that the visual field range and the normal range in the visual field range of a driver be set for each driver, or set depending on the posture of the driver and the like. For example, Patent Literature 1 discloses a distraction determination device that sets a center position of an allowable distraction determination range on the basis of a face orientation or a direction of a line of sight detected by a direction detecting means when a shape of a hand detected by the hand shape detecting means is a preset setting start shape.

CITATION LIST

Patent Literature

Patent Literature 1: JP 2013-164663 A

SUMMARY OF INVENTION

Technical Problem

According to the distraction determination device described in Patent Literature 1 above, to set the center position of the allowable distraction determination range, it is necessary for the driver to obtain a shape of the hand that is the preset setting start shape. For that reason, although it is possible to set the allowable distraction determination range for each driver, there has been a problem that the driver is required to perform a preset operation for the setting.

The present invention has been made to solve the above problem, and it is an object to set a steady state of the driver for determining a driving state for each driver without a preset operation performed by the driver.

Solution to Problem

A driving state determination device according to the present invention includes: a processor; and a memory storing instructions which, when executed by the processor, causes the processor to perform processes of: detecting, from a face image of a driver, position information about feature points of the driver's face as face feature points; detecting face information indicating a state of the driver's face from the detected face feature points; referring to the detected face information, and, creating a frequency distribution of the face information in a preset time section from the detected face information; calculating a mode value of the face information from the created frequency distribution calculating a reference value indicating a steady state of the driver from the mode value of the calculated face information; and determining a driving state of the driver by comparing the calculated reference value with the detected face information.

Advantageous Effects of Invention

According to the present invention, the steady state of the driver can be set for determining the driving state for each driver without a request to the driver for performing the preset operation.

BRIEF DESCRIPTION OF DRAWINGS

FIGS. 3A, 3B, and 3C are diagrams illustrating detection processing in a face feature point detecting unit of the driving state determination device according to the first embodiment.

FIG. 8 is a flowchart illustrating operation of reference value calculation processing of the driving state determination device according to the first embodiment.

DESCRIPTION OF EMBODIMENTS

Hereinafter, to explain the present invention in more detail, embodiments for carrying out the present invention will be described with reference to accompanying drawings.

First Embodiment

Figure 1:
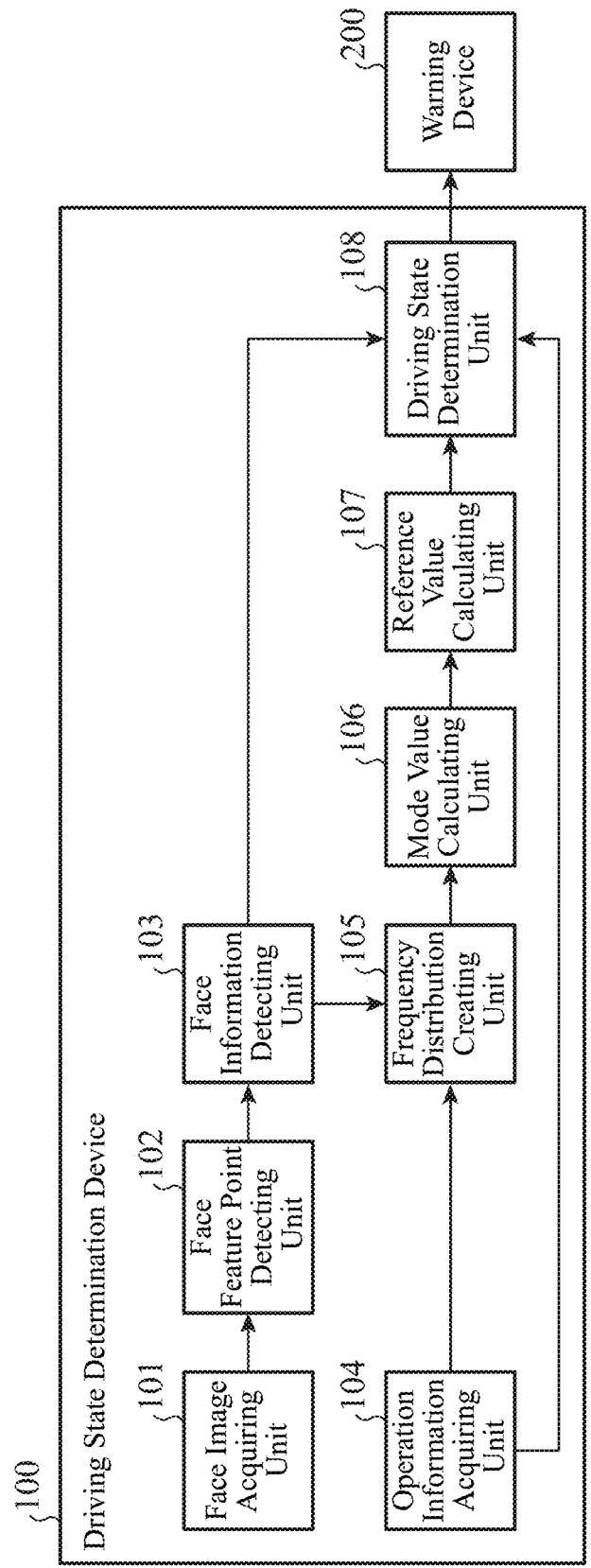
FIG. 1 is a block diagram illustrating a configuration of a driving state determination device according to a first embodiment.

FIG. 1 is a block diagram illustrating a configuration of a driving state determination device 100 according to a first embodiment.

The driving state determination device 100 includes a face image acquiring unit 101, a face feature point detecting unit 102, a face information detecting unit 103, an operation information acquiring unit 104, a frequency distribution creating unit 105, a mode value calculating unit 106, a reference value calculating unit 107, and a driving state determination unit 108.

As illustrated in FIG. 1, the driving state determination device 100 is connected to, for example, a warning device 200.

The face image acquiring unit 101 acquires a face image including at least an entire head region of a driver on the basis of a captured image from a camera or the like mounted on a vehicle. The face image acquiring unit 101 outputs the face image to the face feature point detecting unit 102.

The face feature point detecting unit 102 detects a face region including parts composed of a face, such as eyes, a nose, a mouth, and the like, from the face image acquired by the face image acquiring unit 101. The face feature point detecting unit 102 detects, from the face region detected, position information about each part constituting the face as a feature point of the driver's face. Hereinafter, the feature point of the driver's face will be described as "face feature point". The face feature point detecting unit 102 acquires, as position information about each part constituting the face, information indicating a position on the face image of a component of each part or coordinates on the face image of the component of each part.

The face information detecting unit 103 detects face information by using the face feature point detected by the face feature point detecting unit 102.

The face information is information indicating a state of the driver's face, and includes, for example, a positional relationship between the face feature points, an opening/closing state of the driver's eye, a line of sight of the driver, a face orientation of the driver, a posture of the driver, an oblateness of the driver's eye, a visually-recognizing range of the driver, a visually-recognizing area of the driver, attachment/detachment of a wearing object to the driver's face, and occurrence of contrast on the driver's face. Note that, the wearing object is, for example, glasses, sunglasses, or a mask.

The above-described information indicating the positional relationship between the face feature points is information indicating a positional relationship between the coordinates on the face image, such as the eyes, the nose, the mouth, and the like detected by the face feature point detecting unit 102, and is that a position of the nose is close to the eyes, that the position of the nose is close to the mouth, or the like. Specifically, when the driver looks straight at the camera or the like, the face information detecting unit 103 acquires information indicating a positional relationship indicating that a horizontal position of the nose is positioned at the center of both eyes. In addition, when the driver faces sideways with respect to the camera or the like, the face information detecting unit 103 acquires information indicating a positional relationship indicating what the height of the nose is with respect to the mouth. Note that, when a situation does not frequently occur that the driver faces the front or sideways with respect to the camera or the like, the face information detecting unit 103 estimates and acquires, from the information indicating the positional relationship of the nose, eyes, mouse, and the like detected within a certain period of time, information indicating the positional relationship of the nose, eyes, mouse, and the like when the driver sees the camera or the like from the front or when the driver faces sideways with respect to the camera or the like.

The operation information acquiring unit 104 acquires vehicle operation information indicating an operation state of the vehicle on which the driver boards from a controller area network (CAN), an On-Board Diagnosis (OBD), or the like. The vehicle operation information is, for example, steering angle information of a vehicle, vehicle speed information, turn signal information, opening/closing information of a door, information indicating attachment/detachment of a seat belt by a driver, information indicating seating on a seat of a driver, information indicating change of a seat position, information indicating a shift to a drive mode of a shift position, or the like.

The frequency distribution creating unit 105 refers to the face information detected by the face information detecting unit 103, and when a preset change occurs in the driver's face, the frequency distribution creating unit 105 creates a frequency distribution of the face information in a preset time section. Further, the frequency distribution creating unit 105 refers to the vehicle operation information acquired by the operation information acquiring unit 104, and when a preset vehicle operation is performed on the vehicle, the frequency distribution creating unit 105 creates the frequency distribution of the face information in the preset time section.

The case in which the preset change occurs in the driver's face includes, for example, a case in which when a wearing object is attached/detached to/from the driver's face, a case in which misalignment occurs due to a change in a way of wearing the wearing object, a case in which contrast occurs due to external light incident on the driver's face, or the like.

The case in which the preset vehicle operation is performed on the vehicle includes a case in which operation occurs, such as opening/closing operation of the door of the vehicle, attachment/detachment operation of the seat belt of the vehicle, seating on the seat of the vehicle, change operation of the seat position of the vehicle, shift operation to the drive of the shift lever, or the like.

The frequency distribution creating unit 105 can create the frequency distribution of the face information if at least the face information detected by the face information detecting unit 103 can be referred to.

The mode value calculating unit 106 calculates face information having the highest occurrence frequency as a mode value from the frequency distribution of the face information created by the frequency distribution creating unit 105.

The reference value calculating unit 107 calculates an optimization parameter for each driver from the mode value of the face information calculated by the mode value calculating unit 106. The reference value calculating unit 107 calculates a value (hereinafter referred to as a reference value) of the face information indicating a steady state at the time of driving for each driver by applying the calculated optimization parameter for each driver to a value of the face information in a preset normal driving state. The reference value may be information indicating one value or information indicating a range of a certain value.

The driving state determination unit 108 determines a driving state of the driver by comparing the reference value calculated by the reference value calculating unit 107 with the current face information input from the face information detecting unit 103. The driving state determination unit 108 determines whether the current driving state is a state deviating from the normal driving state, such as determination whether or not the driver is in a state of being distractive, or determination whether or not the driver is in a state of dozing. For example, the driving state determination unit 108 sets a normal visually-recognizing range for each driver on the basis of the reference value calculated by the reference value calculating unit 107, and determines a distractive state of the driver by comparing the set normal visually-recognizing range with the current visually-recognizing range. The driving state determination unit 108 outputs a determination result of the driving state to the warning device 200 or the like.

When the determination result indicating that the current driving state deviates from the normal driving state is input from the driving state determination unit 108, the warning device 200 outputs a warning to occupants including the driver of the vehicle.

Next, a hardware configuration example will be described of the driving state determination device 100.

Figure 2A:
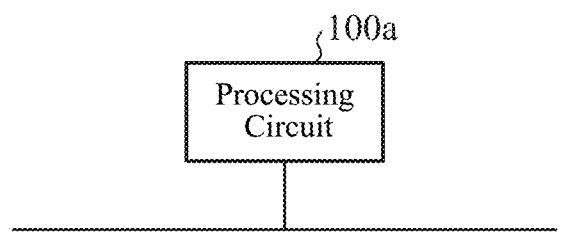
FIGS. 2A and 2B are diagrams illustrating a hardware configuration example of the driving state determination device according to the first embodiment.
Figure 2B:
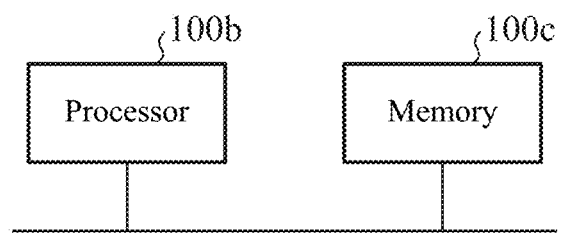

FIGS. 2A and 2B are diagrams illustrating a hardware configuration example of the driving state determination device 100.

In the driving state determination device 100, a processing circuit implements each of functions of the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108. That is, the driving state determination device 100 includes the processing circuit for implementing each of the functions described above. The processing circuit may be a processing circuit 100a that is dedicated hardware as illustrated in FIG. 2A, or a processor 100b for executing a program stored in a memory 100c as illustrated in FIG. 2B.

As illustrated in FIG. 2A, when the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108 each are dedicated hardware, examples of the processing circuit 100a include a single circuit, a composite circuit, a programmed processor, a parallel-programmed processor, an application specific integrated circuit (ASIC), a field-programmable gate array (FPGA), or a combination thereof For the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108, each of the functions of the units may be implemented by a processing circuit, or the functions of the units may be implemented collectively by one processing circuit.

As illustrated in FIG. 2B, when the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108 are the processor 100b, the functions of the units are implemented by software, firmware, or a combination of software and firmware. The software or the firmware is described as a program and stored in the memory 100c. The processor 100b reads and executes the program stored in the memory 100c, thereby implementing the functions of the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108. That is, the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108 include the memory 100c for storing programs by which steps illustrated in FIGS. 8 and 10 described later are executed as a result when executed by the processor 100b. In addition, it can also be said that these programs cause a computer to execute procedures or methods of the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108.

Here, the processor 100b is, for example, a central processing unit (CPU), a processing device, an arithmetic device, a processor, a microprocessor, a microcomputer, a digital signal processor (DSP), or the like.

For example, the memory 100c may be a nonvolatile or volatile semiconductor memory such as random access memory (RAM), read only memory (ROM), flash memory, erasable programmable ROM (EPROM), or electrically EPROM (EEPROM), may be a magnetic disk such as a hard disk or a flexible disk, or may be an optical disc such as a mini disc, a compact disc (CD), or a digital versatile disc (DVD).

Note that, for the functions of the face image acquiring unit 101, the face feature point detecting unit 102, the face information detecting unit 103, the operation information acquiring unit 104, the frequency distribution creating unit 105, the mode value calculating unit 106, the reference value calculating unit 107, and the driving state determination unit 108, the functions may be partially implemented by dedicated hardware and partially implemented by software or firmware. As described above, the processing circuit 100a in the driving state determination device 100 can implement the above-described functions by hardware, software, firmware, or a combination thereof.

Next, the face feature point detecting unit 102, the face information detecting unit 103, the frequency distribution creating unit 105, and the reference value calculating unit 107 will be described in more detail.

First, the face feature point detecting unit 102 will be described with reference to FIG. 3.

FIG. 3 is a diagram illustrating detection processing in the face feature point detecting unit 102 of the driving state determination device 100 according to the first embodiment. FIG. 3A is a diagram illustrating a face image, FIG. 3B is a diagram illustrating a face region, and FIG. 3C is a diagram illustrating face feature points.

The face feature point detecting unit 102 acquires the face image from the face image acquiring unit 101. For example, the face feature point detecting unit 102 acquires a face image 300 illustrated in FIG. 3A. The face feature point detecting unit 102 detects the face region including parts constituting a face with respect to the face image acquired from the face image acquiring unit 101. For example, the face feature point detecting unit 102 detects a face region 301 illustrated in FIG. 3B with respect to the face image 300 of FIG. 3A.

The face feature point detecting unit 102 acquires position information on both outer corners 311 of eyes, both inner corners 312 of the eyes, both upper eyelids 313, and both lower eyelids 314 with respect to the eyes, in the face region 301 detected, for example, as illustrated in FIG. 3C. The face feature point detecting unit 102 acquires position information on a nose root 315, a nose tip 316, a nose ridge and nose wing with respect to the nose, in the face region 301, for example, as illustrated in FIG. 3C. The face feature point detecting unit 102 acquires position information on an upper lip 317, a lower lip 318, and mouth corners 319 with respect to the mouth, in the face region 301, for example, as illustrated in FIG. 3C. The position information on the component of each part acquired by the face feature point detecting unit 102 is information indicating a position from a start point O of the face image 300 illustrated in FIG. 3A, or coordinates in the face image 300 illustrated in FIG. 3A. These pieces of position information are detected as the face feature points.

Next, the face information detecting unit 103 will be described with reference to FIGS. 4 to 6.

Figure 4A:
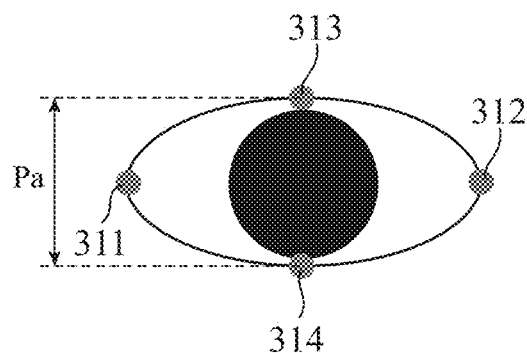
FIGS. 4A and 4B are diagrams illustrating detection of an opening/closing state of an eye in a face information detecting unit of the driving state determination device according to the first embodiment.
Figure 4B:
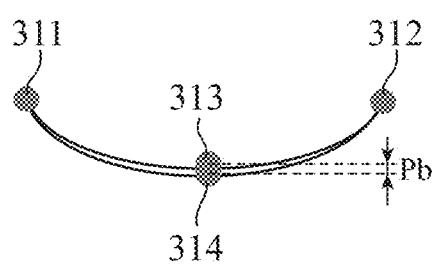
Figure 5A:
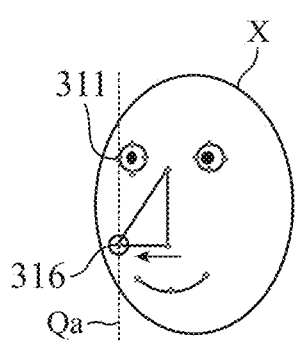
FIGS. 5A, 5B, and 5C are diagrams illustrating information indicating a positional relationship between face feature points, and detection of a face orientation in the face information detecting unit of the driving state determination device according to the first embodiment.
Figure 5B:
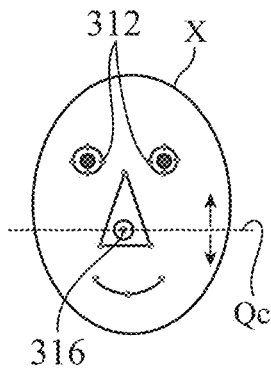
Figure 5C:
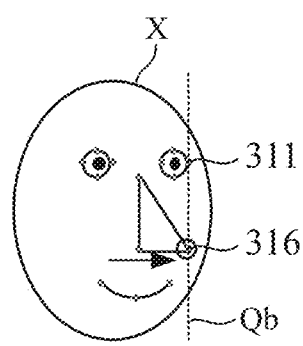
Figure 6:
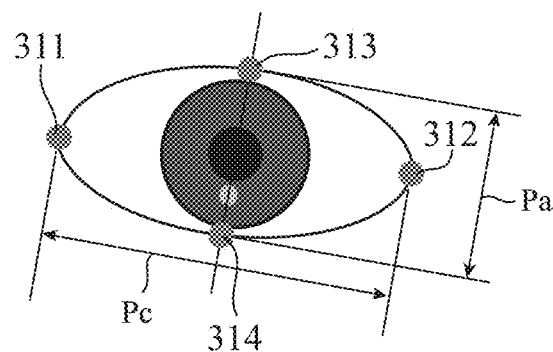
FIG. 6 is a diagram illustrating detection of an oblateness of the eye in the face information detecting unit of the driving state determination device according to the first embodiment.

FIGS. 4 to 6 are diagrams illustrating detection processing in the face information detecting unit 103 of the driving state determination device 100 according to the first embodiment. FIGS. 4A and 4B are diagrams illustrating detection of the opening/closing state of the eye, FIGS. 5A, 5B, and 5C are diagrams illustrating information indicating the positional relationship between the face feature points, and detection of the face orientation, and FIG. 6 is a diagram illustrating detection of the oblateness of the eye.

The face information detecting unit 103 detects whether the eye is open or the eye is closed from the position information on the upper eyelid and the position information on the lower eyelid out of the position information about the eye included in the face feature points, and further calculates a degree of opening of the eye.

As illustrated in FIG. 4A, the face information detecting unit 103 calculates a distance Pa between the upper eyelid 313 and the lower eyelid 314 from the position information on the upper eyelid 313 and the position information on the lower eyelid 314. In the example of FIG. 4A, the face information detecting unit 103 detects that the eye is open since the distance Pa calculated is longer than a set value. In addition, in the example of FIG. 4B, the face information detecting unit 103 detects that the eye is closed since a distance Pb calculated is shorter than a set value. In addition, the face information detecting unit 103 compares the calculated distances Pa and Pb with a preset distance value, and calculates the degree of opening of the eye. Further, the face information detecting unit 103 specifies a region of the eye on the basis of the position information about the eye, and searches for a region having the lowest luminance in the region of the eye specified. The face information detecting unit 103 obtains a position of the iris or the pupil from the region having the lowest luminance searched for, and detects the line of sight of the driver.

The face information detecting unit 103 acquires information indicating the positional relationship between the eyes, the nose, and the mouth obtained from the face feature points. In addition, the face information detecting unit 103 detects the face orientation of the driver's face from the information indicating the positional relationship between the eyes, the nose, and the mouth acquired. For example, as illustrated in FIGS. 5A to 5C, the face information detecting unit 103 acquires the positional relationship between the nose tip and the both eyes. In addition, the face information detecting unit 103 estimates a displacement amount of the face of a driver X and detects the face orientation of the driver X, from the positional relationship between the nose tip and the both eyes.

In the case of FIG. 5A, the face information detecting unit 103 detects that the face orientation of the driver X is right, since the nose tip 316 is positioned near a straight line Qa passing through the outer corner 311 of the left eye.

In the case of FIG. 5B, the face information detecting unit 103 detects that the face orientation of the driver X is the front, since the nose tip 316 is positioned between the both inner corners 312.

In the case of FIG. 5C, the face information detecting unit 103 detects that the face orientation of the driver X is the left, since the nose tip 316 is positioned near a straight line Qb passing through the outer corner 311 of the right eye.

In addition, as illustrated in FIG. 5B, the face information detecting unit 103 uses a straight line Qc passing through a point where the nose tip is positioned when the driver is facing forward, and detects a vertical orientation of the face of the driver X. The straight line Qc is obtained in advance from the face image in a state in which the driver faces the front in both the vertical direction and the horizontal direction. The face information detecting unit 103 detects whether the face orientation of the driver X is upward or downward depending on whether the nose tip 316 is positioned on the upper side or the lower side of the straight line Qc.

Further, the face information detecting unit 103 calculates the oblateness of the eye from the position information on the upper eyelid, the lower eyelid, the outer corner, and the inner corner out of the position information about the eyes included in the face feature points.

For example, as illustrated in FIG. 6, the face information detecting unit 103 obtains the height of the eye from the distance Pa between the upper eyelid 313 and the lower eyelid 314, and obtains the width of the eye from a distance Pc between the outer corner 311 and the inner corner 312. The face information detecting unit 103 calculates the oblateness of the eye by dividing the obtained width of the eye (distance Pc) by the height of the eye (distance Pa).

Further, the face information detecting unit 103 detects the visually-recognizing range of the driver. The visually-recognizing range of the driver is a range (effective visual field) in which information can be received instantaneously only by eye movements with respect to the front view of the driver. The face information detecting unit 103 detects, as the visually-recognizing range of the driver, for example, a range of ±15° in the horizontal direction, 8° upward in the vertical direction, and 12° downward in the vertical direction with respect to the front view of the driver. Note that, the values in the horizontal direction and the vertical direction with respect to the front view of the driver described above are parameters that can be changed. The above numerical values are examples, and other different values may be set.

The face information detecting unit 103 may acquire the visually-recognizing area of the driver instead of the visually-recognizing range described above. The visually-recognizing area of the driver is represented by information indicating which structure out of structures of the vehicle is included in the effective visual field of the driver. For example, when a meter display and a center information display (CID) are included in the effective visual field of the driver, the face information detecting unit 103 acquires, information indicating the meter display and the CID as the visually-recognizing area.

Specifically, it is assumed that the face information detecting unit 103 acquires in advance information indicating installation positions of structures visible to the driver, such as the meter display, the CID, a head-up display (HUD), left and right side mirrors, and a rearview mirror out of the structures of the vehicle. In addition, it is assumed that the face information detecting unit 103 acquires in advance information indicating an installation position of a camera for capturing the face image input to the face image acquiring unit 101.

The face information detecting unit 103 calculates a relative position between the driver's face and the camera on the basis of a depth distance obtained from a position of the nose tip included in the face feature points, for example. Using the relative position and relative positional relationships between the camera and the structures, the face information detecting unit 103 acquires information indicating which structure exists in the effective visual field of the driver, and outputs the information as the visually-recognizing area.

Note that, it may be assumed that a position of an A pillar, a position of a dashboard, a visor position storing the CID, and the like are measured in advance, and the face information detecting unit 103 acquires these positions in advance. In this case, utilizing areas whose boundaries are defined on the basis of these positions, the face information detecting unit 103 outputs the visually-recognizing area of the occupant as a windshield, a driver side window, a passenger side window, a center console region, or the like.

In addition, the face information detecting unit 103 detects whether a wearing object is attached/detached to/from the face of the driver, or misalignment of the wearing object on the face of the driver occurs on the basis of the face feature points and the face image itself.

In addition, using the luminance of the face image acquired by the face image acquiring unit 101 and the face feature point detected by the face feature point detecting unit 102, the face information detecting unit 103 determines whether or not the luminance is changed only in the vicinity of the face feature point.

When determining that the change in the luminance occurs not only in the vicinity of the face feature point but also in the entire face region, the face information detecting unit 103 corrects an exposure time to adjust an average luminance of the entire face region by using an auto exposure (AE) function of a camera or the like mounted in the vehicle, for example.

When determining that the luminance is changed only in the vicinity of the face feature point, the face information detecting unit 103 determines that contrast occurs on the face, for example, due to influence of external light, and detects occurrence of the contrast as the face information.

Next, the frequency distribution creating unit 105 will be described.

The frequency distribution creating unit 105 refers to the face information detected by the face information detecting unit 103, and when a preset change occurs in the driver's face, the frequency distribution creating unit 105 creates a frequency distribution of the face information in a preset time section. Further, the frequency distribution creating unit 105 refers to the vehicle operation information acquired by the operation information acquiring unit 104, and when the preset vehicle operation is performed on the vehicle, the frequency distribution creating unit 105 creates the frequency distribution of the face information in the preset time section.

It is assumed that detection of face feature points by the face feature point detecting unit 102 is performed at any time while the occupant uses the vehicle, for example, at every predetermined period, and the face information detecting unit 103 always detects the face information from the face feature points detected, and the face information is stored in a storage area (not illustrated). In the driving state determination device 100, to improve accuracy of driving state determination, it is preset that, out of the face information stored, the face information of which time section is used for creating the frequency distribution.

First, a case will be described where the frequency distribution creating unit 105 creates the frequency distribution of the face information in the preset time section when a change on the driver's face occurs.

In the driving state determination device 100, out of the states of the driver's face indicated by the face information, the attachment/detachment of the wearing object to/from the face, the misalignment of the wearing object, or the occurrence of the contrast on the face is preset as the change on the driver's face that is a starting point of frequency distribution creation by the frequency distribution creating unit 105.

When the face information indicating that the attachment/detachment of the wearing object to/from the face or the misalignment of the wearing object is detected is input from the face information detecting unit 103, the frequency distribution creating unit 105 starts creating the frequency distribution of the face information in the preset time section.

Further, when the face information indicating that the contrast occurs in the face is input from the face information detecting unit 103, the frequency distribution creating unit 105 starts creating the frequency distribution of the face information in the preset time section.

Next, a case will be described where the frequency distribution creating unit 105 creates the frequency distribution of the face information in the preset time section when the preset vehicle operation is performed.

In the driving state determination device 100, out of the vehicle operation, for example, opening/closing of the door, attachment/detachment of the seat belt, seating on the seat, change of the seat position, and shift in shift position to the drive mode are preset as the vehicle operation that is a starting point of frequency distribution creation by the frequency distribution creating unit 105.

The frequency distribution creating unit 105 starts creating the frequency distribution of the face information in the preset time section with acquisition of the vehicle operation information indicating that the preset vehicle operation is performed from the operation information acquiring unit 104 as the starting point.

The frequency distribution creating unit 105 may use only the face information in the case that the position of the face region detected by the face information detecting unit 103 exists in an effective face position region set in advance, for creating the frequency distribution. Here, the effective face position region is a region that defines a range in which the face region is positioned when the driver is seated in the driver's seat.

Figure 7:
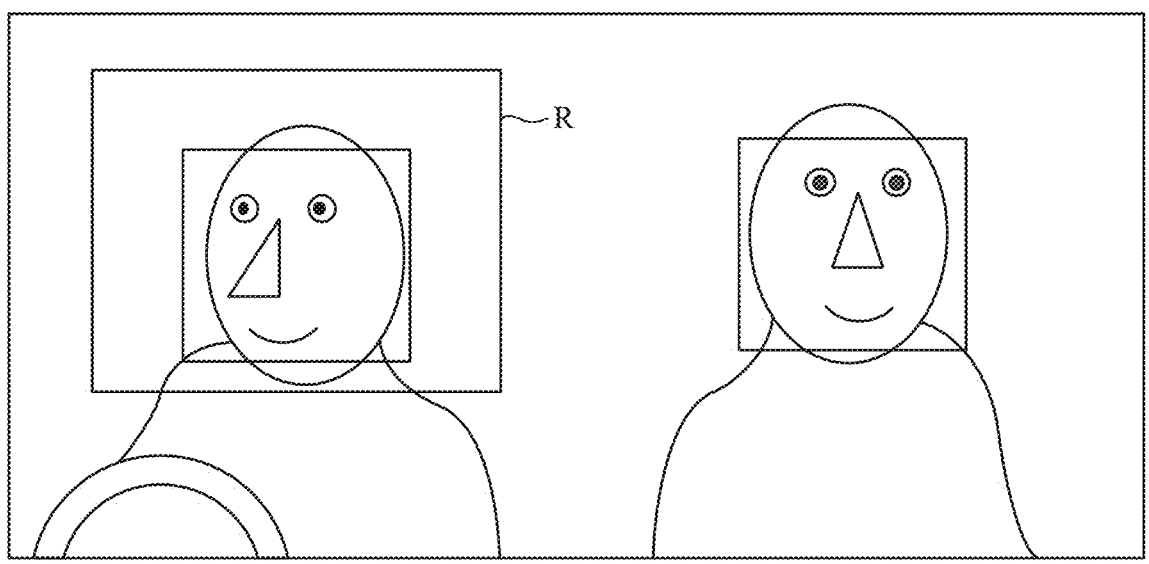
FIG. 7 is a diagram illustrating an example of an effective face position region referred to by a frequency distribution creating unit of the driving state determination device according to the first embodiment.

FIG. 7 is a diagram illustrating an example of the effective face position region referred to by the frequency distribution creating unit 105 of the driving state determination device 100 according to the first embodiment.

An effective face position region R is preset on the basis of a position of a headrest provided in the driver's seat, a backrest of the seat, or the like, for example.

In addition, the frequency distribution creating unit 105 may use, for frequency distribution creation, only the face information in the case that the face orientation of the driver detected by the face information detecting unit 103 is a face orientation within a preset certain range, or only the face information in the case that a variation amount from a previous frame in the line of sight of the driver or in the face orientation of the driver is smaller than a certain value.

Next, the reference value calculating unit 107 will be described.

The reference value calculating unit 107 calculates the optimization parameter for each driver by using the mode value calculated by the mode value calculating unit 106. The reference value calculating unit 107 calculates the reference value by applying the calculated optimization parameter for each driver to the value of the face information in the preset normal driving state. The reference value is a value of the face information in the normal driving state for each driver as described above. Here, the normal driving state is the face orientation in the front view when the driver drives, the oblateness of the eyes in the driver's steady state, or the like.

The reference value calculating unit 107 calculates and updates the reference value at preset timing when the vehicle travels. The timing can be freely set at which the reference value calculating unit 107 calculates and updates the reference value. For example, in the reference value calculating unit 107, with respect to the face orientation in the front view in the driving state of the driver, the update timing is set to a value at which the frequency is relatively high, such as every 5 minutes, and with respect to the oblateness of the eye in the steady state of the driver, the update timing is set to a value at which the frequency is relatively low, such as every 1 hour. As described above, the update timing can be set in accordance with characteristics of items.

Next, operations of the driving state determination device 100 will be described. The operations of the driving state determination device 100 will be described separately for operation of reference value calculation processing and operation of driving state determination processing.

First, the operation of the reference value calculation processing will be described with reference to a flowchart of FIG. 8.

FIG. 8 is a flowchart illustrating operation of calculation processing of a normal range of the driving state of the driving state determination device 100 according to the first embodiment. In the flowchart of FIG. 8, as an example, a case will be described where the frequency distribution creating unit 105 creates the frequency distribution of the face information with reference to the face information and the vehicle operation information.

When the face image acquiring unit 101 acquires the face image (step ST1), the face feature point detecting unit 102 detects the face region including the parts constituting the face from the face image acquired (step ST2). The face feature point detecting unit 102 acquires the position information on each part constituting the face existing in the face region detected in step ST2 (step ST3). The face information detecting unit 103 detects the face information from the position information on each part constituting the face acquired in step ST3 (step ST4). In step ST4, the face information indicating occurrence of contrast may be detected on the basis of the face image.

The frequency distribution creating unit 105 determines whether or not the preset change occurs in the driver's face with reference to the face information detected in step ST4, and determines whether or not the preset vehicle operation is performed on the vehicle with reference to the vehicle operation information (step ST5). When no preset change occurs in the driver's face and no preset vehicle operation is performed on the vehicle (step ST5; NO), the processing returns to the processing of step ST1. In contrast, when the preset change occurs in the driver's face, or when the preset vehicle operation is performed on the vehicle (step ST5; YES), the frequency distribution creating unit 105 creates the frequency distribution of the face information in the preset time section (step ST6).

The mode value calculating unit 106 calculates the mode value of the face information from the frequency distribution created in step ST6 (step ST7). The reference value calculating unit 107 calculates the optimization parameter for each driver from the mode value of the face information calculated in step ST7 (step ST8). The reference value calculating unit 107 calculates the reference value by applying the optimization parameter calculated in step ST8 to the value of the face information in the preset normal driving state (step ST9). The reference value calculating unit 107 applies the reference value calculated in step ST9 to the driving state determination unit 108 (step ST10), and returns to the processing of step ST1.

Note that, it is assumed that in the iterative processing of the flowchart of FIG. 8, the frequency distribution of the face information is created on the basis of a determination result that the preset change occurs in the driver's face at least once (step ST5; YES) in step ST6.

In addition, in the flowchart of FIG. 8, a case has been described where the frequency distribution creating unit 105 refers to the face information and the vehicle operation information, as an example; however, the frequency distribution creating unit 105 can perform determination with reference to only the face information, and create the frequency distribution of the face information.

The driving state determination unit 108 sets the normal visually-recognizing range on the basis of the reference value applied in step ST10. FIG. 9 illustrates an example of the normal visually-recognizing range set by the driving state determination unit 108.

FIG. 9 is a diagram illustrating the example of the normal visually-recognizing range set by the driving state determination unit 108 of the driving state determination device 100 according to the first embodiment.

Figure 9A:
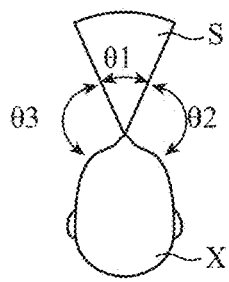
FIGS. 9A and 9B are diagrams illustrating an example of a normal visually-recognizing range set by a driving state determination unit of the driving state determination device according to the first embodiment.
Figure 9B:
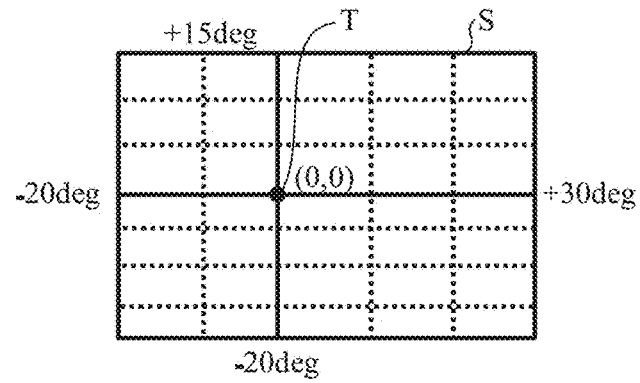

FIG. 9A is a diagram of the normal visually-recognizing range as viewed from above, and FIG. 9B is a diagram of the normal visually-recognizing range as viewed from a viewpoint position of the driver X.

In FIG. 9A, a range of an angle θ1 is a normal visually-recognizing range S, and a range other than the normal visually-recognizing range S (for example, ranges of angles θ2 and θ3) is a region in which it is determined to be distractive driving.

A base point T(0, 0) within the normal visually-recognizing range S of FIG. 9B indicates the face orientation of the driver in the front view. Ranges in the vertical and horizontal directions with respect to the base point T (+15 deg in the upward direction, −20 deg in the downward direction, −20 deg in the left direction, +30 deg in the right direction in the example of FIG. 9B) are set on the basis of the reference value calculated by the reference value calculating unit 107.

Note that, the normal visually-recognizing ranges illustrated in FIGS. 9A and 9B are examples, and are not limited to these ranges.

In addition, when the vehicle has a manual driving mode in which the driver manually drives and an automatic driving mode in which driving control is automatically performed on the vehicle side, and there is a plurality of automatic driving levels in the automatic driving mode, the driving state determination unit 108 may dynamically change the normal visually-recognizing range S on the basis of the automatic driving level of the vehicle.

It is assumed that, for example, the automatic driving levels exist ranging from a level that is a mode following a preceding vehicle, which reduces attention to the inter-vehicle distance and the traveling speed but requires attention equivalent to manual driving in terms of another driving operations (automatic driving level 1), to a level that is a mode in which driving of a host vehicle is fully automated, which does not requires driving operations, a danger avoidance operation, or the like by the driver (automatic driving level 3). For example, in the automatic driving level 3, the normal visually-recognizing range S illustrated in FIG. 9B may be widened in the vertical and horizontal directions, and the range in which the distractive driving is determined may be narrowed.

Next, the operation will be described of the driving state determination processing with reference to the flowchart of FIG. 10.

Figure 10:
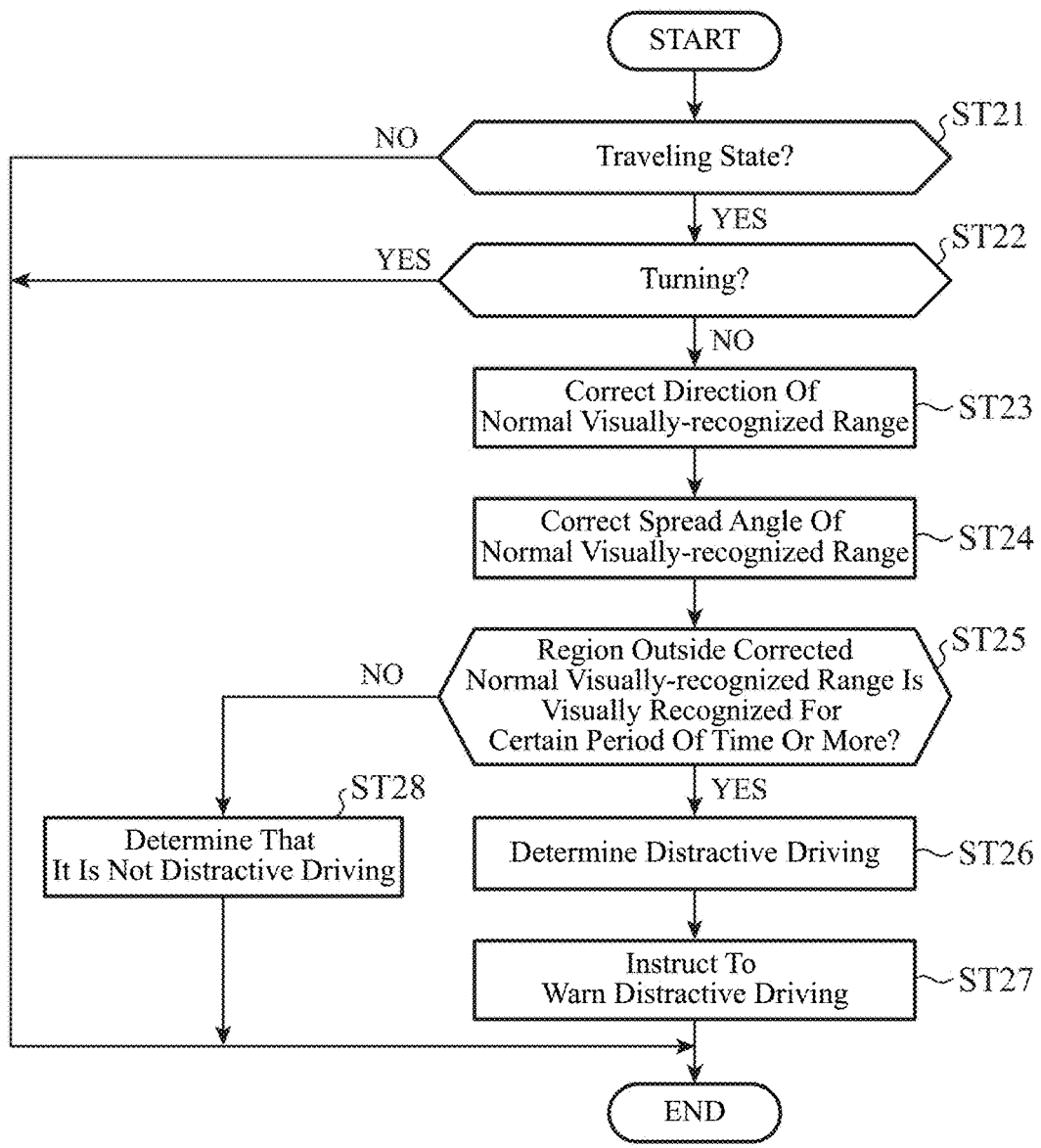
FIG. 10 is a flowchart illustrating operation of driving state determination processing in the driving state determination device according to the first embodiment.

FIG. 10 is a flowchart illustrating the operation of the driving state determination processing in the driving state determination device 100 according to the first embodiment. In the flowchart of FIG. 10, as an example, a case will be described where determination is performed whether or not the driver is looking aside while driving, as the driving state of the driver.

Description will be made on the assumption that the driving state determination unit 108 sets the normal visually-recognizing range described above on the basis of the reference value calculated by the reference value calculating unit 107.

The driving state determination unit 108 determines whether or not the vehicle is in a traveling state with reference to gear information and vehicle speed information input from the operation information acquiring unit 104 (step ST21). When the vehicle is not traveling (step ST21; NO), the determination processing of step ST21 is repeated. In contrast, when the vehicle is traveling (step ST21; YES), the driving state determination unit 108 determines whether or not the vehicle is turning with reference to turn signal information input from the operation information acquiring unit 104 (step ST22). When the vehicle is turning (step ST22; YES), the processing returns to the processing of step ST21, and the above-described processing is repeated. This is because it is highly likely that distraction determination during vehicle turning operation at the time of right/left turning becomes driver distraction (DD), and it is difficult to specify a distraction range, the distraction determination is not performed.

In contrast, when the vehicle is not turning (step ST22; NO), the driving state determination unit 108 predicts a turning direction of the vehicle with reference to steering angle information input from the operation information acquiring unit 104, and corrects a direction of the normal visually-recognizing range (step ST23). Further, the driving state determination unit 108 corrects a spread angle of the normal visually-recognizing range or the normal visually-recognizing range whose direction is corrected in step ST23 with reference to the vehicle speed information input from the operation information acquiring unit 104 (step ST24). From the line of sight of the driver or the face orientation of the driver input from the face information detecting unit 103, the driving state determination unit 108 determines whether or not the driver visually recognizes a region outside the normal visually-recognizing range obtained by correction in step ST23 and step ST24 for a certain period of time or more (step ST25).

When the region is visually recognized for the certain period of time or more (step ST25; YES), the driving state determination unit 108 determines that the driver is looking aside while driving (step ST26). The driving state determination unit 108 performs processing of instructing the warning device 200 to warn the distractive driving, for example (step ST27), and returns to the processing of step ST21. In contrast, when the region is not visually recognized for the certain period of time or more (step ST25; NO), the driving state determination unit 108 determines that the driver is not looking aside while driving (step ST28), and returns to the processing of step ST21.

The correction of the direction of the normal visually-recognizing range in step ST23 of the above-described flowchart of FIG. 10 will be described with reference to FIG. 11.

FIGS. 11 are diagrams illustrating an example of correction of the normal visually-recognizing range by the driving state determination unit 108 of the driving state determination device 100 according to the first embodiment.

Figures 11A, 11B, 11C:
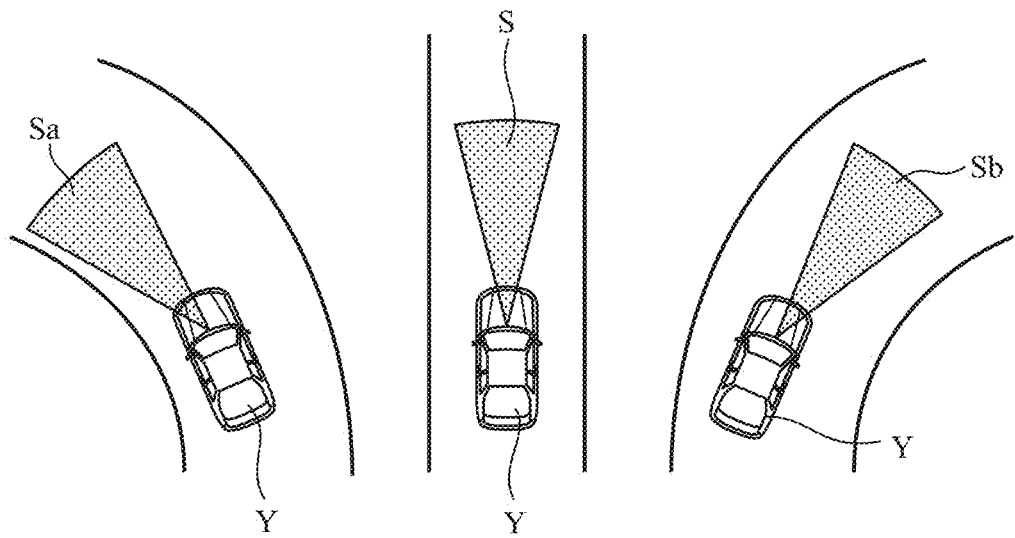
FIGS. 11A, 11B, and 11C are diagrams illustrating an example of correction of the normal visually-recognizing range by the driving state determination unit of the driving state determination device according to the first embodiment.

FIG. 11A illustrates a case where the direction is corrected, in which the normal visually-recognizing range S illustrated in FIG. 9A is directed to the left side with respect to the driver X to be set as a normal range Sa when it is predicted that a vehicle Y is turning to the left. FIG. 11C illustrates a case where the direction is corrected, in which the normal visually-recognizing range S illustrated in FIG. 9A is directed to the right side with respect to the driver X to be set as a normal visually-recognizing range Sb when it is predicted that the vehicle Y is turning to the right. Note that, as illustrated in FIG. 11B, when it is predicted that the vehicle Y is traveling in the straight-ahead direction, correction of the direction of the normal visually-recognizing range S is not performed.

The correction of the spread angle of the normal visually-recognizing range in step ST24 of the above-described flowchart will be described with reference to FIG. 12.

FIGS. 12 are diagrams illustrating an example of the correction of the normal visually-recognizing range by the driving state determination unit 108 of the driving state determination device 100 according to the first embodiment.

Figures 12A, 12B:
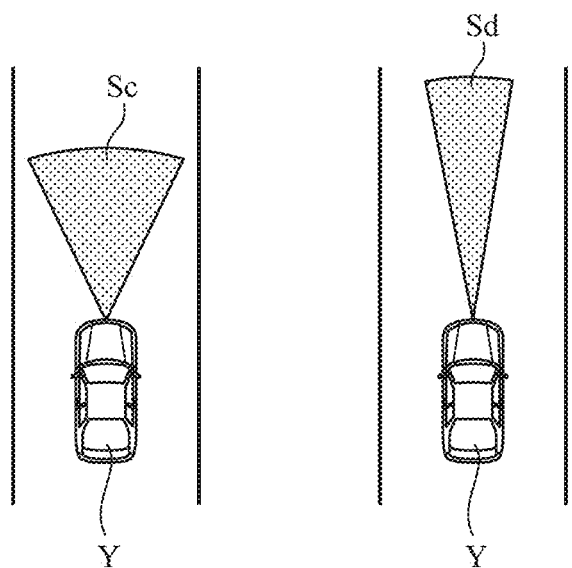
FIGS. 12A and 12B are diagrams illustrating an example of the correction of the normal visually-recognizing range by the driving state determination unit of the driving state determination device according to the first embodiment.

FIG. 12A illustrates correction in which the spread angle of the normal visually-recognizing range S illustrated in FIG. 9A is extended to be set as a normal visually-recognizing range Sc when the vehicle Y is traveling at a low speed equal to or lower than a lower limit threshold. In FIG. 12B, correction is performed in which the spread angle of the normal visually-recognizing range S illustrated in FIG. 9A is reduced to be set as a normal visually-recognizing range Sd when the vehicle Y is traveling at a high speed equal to or higher than an upper limit threshold. Note that, when the vehicle is traveling at the vehicle speed within a threshold range, the correction is not performed of the spread angle of the normal visually-recognizing range S.

Besides distractive driving determination processing illustrated in the flowchart of FIG. 10, the driving state determination unit 108 can also perform processing of determining whether or not the driver is performing dozing driving.

As described above, according to the first embodiment, there are included: the face feature point detecting unit 102 for detecting, from the face image of the driver, the position information about the feature points of the driver's face as the face feature points; the face information detecting unit 103 for detecting the face information indicating the state of the driver's face from the face feature points detected; the frequency distribution creating unit 105 for referring to the face information detected, and when the preset change occurs in the driver's face, creating the frequency distribution of the face information in the preset time section and; the mode value calculating unit 106 for calculating the mode value of the face information from the frequency distribution created; the reference value calculating unit 107 for calculating the reference value indicating the steady state of the driver from the mode value of the face information calculated; and the driving state determination unit 108 for determining the driving state of the driver by comparing the reference value calculated with the face information detected, so that the reference value for determining the driving state for each driver can be calculated without a request to the driver for performing the preset operation. In addition, on the basis of the reference value, the normal visually-recognizing range for determining the driving state for each driver can be set. Thus, deterioration in the accuracy of the determination result of the driving state due to influence of individual differences of drivers can be alleviated.

In addition, according to the first embodiment, there is included the operation information acquiring unit 104 for acquiring the vehicle operation information indicating the operation state of the vehicle on which the driver boards, and the frequency distribution creating unit 105 refers to the vehicle operation information acquired, and when the preset vehicle operation is performed on the vehicle, creates the frequency distribution, so that the normal visually-recognizing range for determining the driving state for each driver can be set without a request to the driver for performing the preset operation.

In addition, according to the first embodiment, the face information detecting unit detects attachment/detachment of the wearing object to the driver's face as the face information, so that determination of the driving state can be performed also in consideration of behavior predicted to fluctuate after the start of driving.

Note that, the reference value calculation processing and the driving state determination processing described in the above-described first embodiment each are processing repeatedly executed while the vehicle is traveling.

In addition, in the above-described first embodiment, a case has been described where the frequency distribution of the face information is created with reference to the face information detected by the face information detecting unit 103 and the vehicle operation information acquired by the operation information acquiring unit 104; however, the frequency distribution creating unit 105 can create the frequency distribution of the face information if at least the face information detected by the face information detecting unit 103 can be referred to. This point is the same in the second embodiment and the third embodiment below.

Second Embodiment

In this second embodiment, a configuration will be described for performing driver face authentication.

Figure 13:
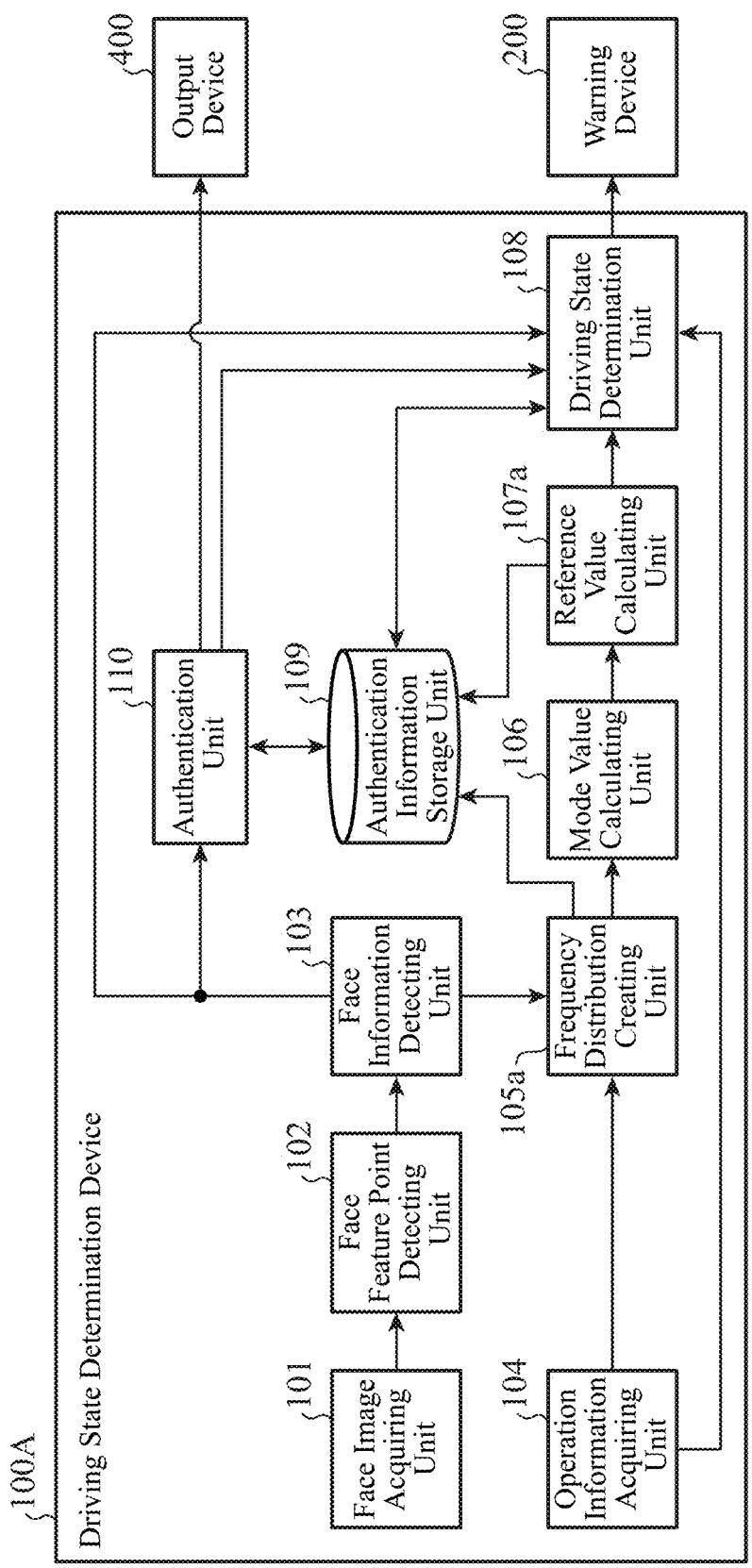
FIG. 13 is a block diagram illustrating a configuration of a driving state determination device according to a second embodiment.

FIG. 13 is a block diagram illustrating a configuration of a driving state determination device 100A according to the second embodiment.

The driving state determination device 100A according to the second embodiment has a configuration in which an authentication information storage unit 109 and an authentication unit 110 are added to the driving state determination device 100 of the first embodiment illustrated in FIG. 1. In addition, instead of the frequency distribution creating unit 105 and the reference value calculating unit 107, a frequency distribution creating unit 105a and a reference value calculating unit 107a are included.

Hereinafter, the same components or corresponding portions as those of the driving state determination device 100 according to the first embodiment are denoted by the same reference numerals as those used in the first embodiment, and the description thereof will be omitted or simplified.

The reference value calculating unit 107a stores the reference value calculated by the processing described in the first embodiment in the authentication information storage unit 109 in association with identification information of the driver. The identification information of the driver is input to the reference value calculating unit 107a via an input device (not illustrated), for example.

The authentication information storage unit 109 is a region for storing the reference value calculated by the reference value calculating unit 107a in association with the identification information of the driver. The authentication information storage unit 109 may be included in the driving state determination device 100A, may be included in another onboard device (not illustrated) mounted in the vehicle, or may be included in an external server (not illustrated).

The authentication unit 110 collates the face information detected by the face information detecting unit 103 with the reference value stored in the authentication information storage unit 109. The authentication unit 110 performs authentication of the driver with reference to the identification information of the driver associated with the reference value matching the face information. When the authentication of the driver is successful, the authentication unit 110 instructs the driving state determination unit 108 to start determination of the driving state. In addition, the authentication unit 110 outputs information indicating that the authentication of the driver is successful, to an output device 400 including, for example, a monitor or a speaker. In addition, when the authentication of the driver is unsuccessful, the authentication unit 110 outputs information indicating that the authentication is unsuccessful, for example, to the output device 400.

The driving state determination unit 108 determines the driving state of the driver by comparing the reference value stored in the authentication information storage unit 109 with the face information of the driver input from the face information detecting unit 103. Not that, the driving state determination unit 108 may determine the driving state of the driver by comparing the reference value input from the reference value calculating unit 107a with the face information of the driver input from the face information detecting unit 103, as in the first embodiment. The driving state determination processing by the driving state determination unit 108 is similar to that of the first embodiment.

The frequency distribution creating unit 105a updates the reference value stored in the authentication information storage unit 109 by using temporal change of the face information calculated by the processing described in the first embodiment.

The frequency distribution creating unit 105a calculates the temporal change of the face information with attachment/detachment of the wearing object to the driver's face as a trigger, and updates the reference value stored in the authentication information storage unit 109, as described in the first embodiment. It is suitable that the authentication information storage unit 109 classifies and stores the reference value depending on the type of the wearing object to the face, for example, glasses, sunglasses, a mask, and the like. In addition, at a timing when the wearing object to the face is removed, the frequency distribution creating unit 105a may update the reference value stored in the authentication information storage unit 109 to interpolate the face information by selectively updating missing face information.

Similarly, the frequency distribution creating unit 105a calculates the temporal change of the face information with occurrence of contrast in a partial region of the driver's face as a trigger, and updates the reference value stored in the authentication information storage unit 109, as described in the first embodiment.

Next, a hardware configuration example will be described of the driving state determination device 100A. Note that, the description of the same configuration as that of the first embodiment will be omitted.

The frequency distribution creating unit 105a, the reference value calculating unit 107a, and the authentication unit 110 in the driving state determination device 100A are the processing circuit 100a illustrated in FIG. 2A or the processor 100b for executing a program stored in the memory 100c illustrated in FIG. 2B.

Next, operation will be described of the authentication of the driver by the driving state determination device 100A.

Figure 14:
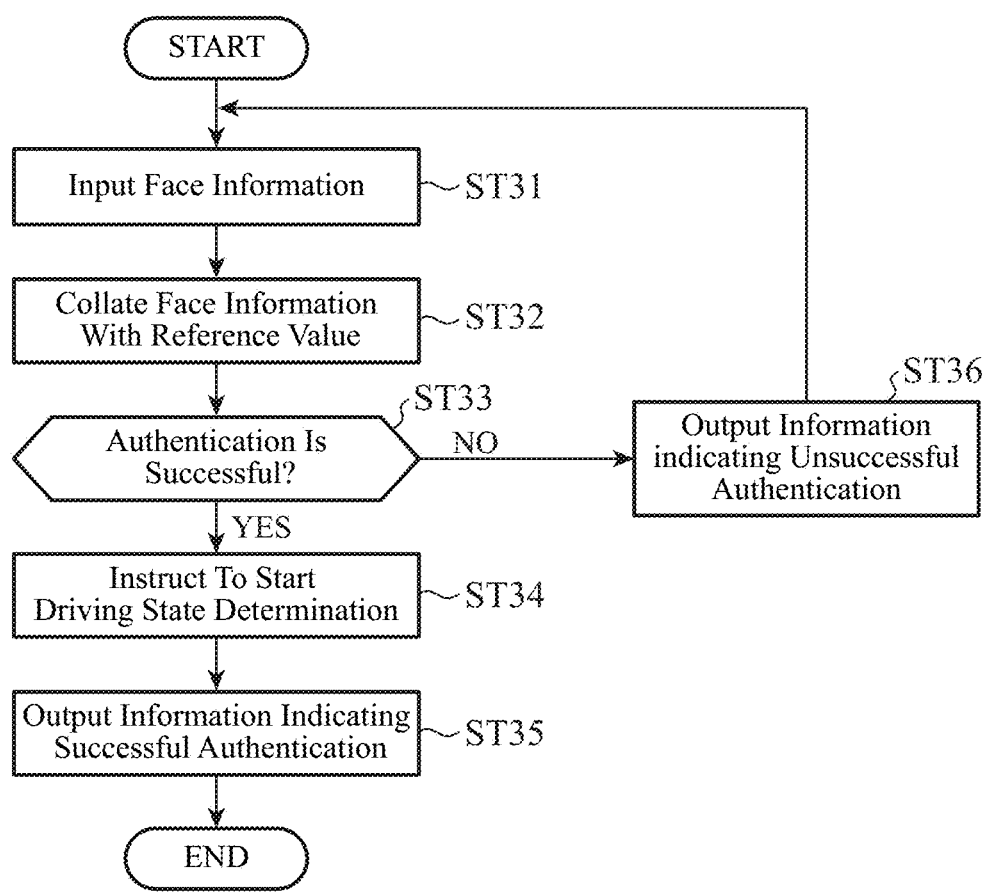
FIG. 14 is a flowchart illustrating operation of an authentication unit of the driving state determination device according to the second embodiment.

FIG. 14 is a flowchart illustrating operation of the authentication unit 110 of the driving state determination device 100A according to the second embodiment. The operation of the authentication of the driver illustrated in FIG. 14 is performed when the driver gets into the vehicle, for example, when the driver sits in the driver's seat.

When face information is input from the face information detecting unit 103 (step ST31), the authentication unit 110 collates the face information input with the reference value stored in the authentication information storage unit 109 (step ST32). The authentication unit 110 determines whether or not the authentication of the driver is successful with reference to a collation result (step ST33). When the authentication of the driver is successful (step ST33; YES), the authentication unit 110 instructs the driving state determination unit 108 to start determination of the driving state (step ST34). In addition, the authentication unit 110 outputs information indicating that the authentication of the driver is successful, to the output device 400 (step ST35), and ends the processing.

In contrast, when the authentication of the driver is unsuccessful (step ST33; NO), the authentication unit 110 outputs information indicating that the authentication of the driver is unsuccessful, to the output device 400 (step ST36). Thereafter, the processing of the flowchart returns to the processing in step ST31, and the above-described processing is repeated.

As described above, according to the second embodiment, there are included the authentication information storage unit 109 in which the reference value calculated by the reference value calculating unit 107a is stored in association with the identification information of the driver, and the authentication unit 110 for performing authentication of the driver by collating the face information acquired with the reference value stored, so that the authentication of the driver can be performed on the basis of the reference value calculated for each driver. Thus, decrease can be alleviated in the accuracy of an authentication result due to influence of individual differences of drivers.

In addition, according to the second embodiment, when the face information detecting unit 103 detects, as the face information, attachment/detachment of the wearing object to the driver's face or the misalignment of the wearing object, or occurrence of contrast on the driver's face, the reference value stored in the authentication information storage unit 109 is updated on the basis of the calculated changes in the feature points of the driver's face, so that the driver can be authenticated in consideration of attachment/detachment of the wearing object to the driver's face, a seating posture of the driver, influence of external light, or the like predicted to fluctuate after the start of driving.

In addition, the driving state determination unit determines the driving state of the driver by comparing the reference value stored in the authentication information storage unit 109 when the authentication unit completes the authentication of the driver with the face information detected by the face information detecting unit 103, so that the driving state can be determined in consideration of attachment/detachment of the wearing object to the driver's face, a seating posture of the driver, influence of external light, or the like predicted to fluctuate after the start of driving.

Third Embodiment

In this third embodiment, a configuration will be described in which a temporal change of the face information for each driver is stored together with information around the vehicle, and authentication of the driver is performed.

Figure 15:
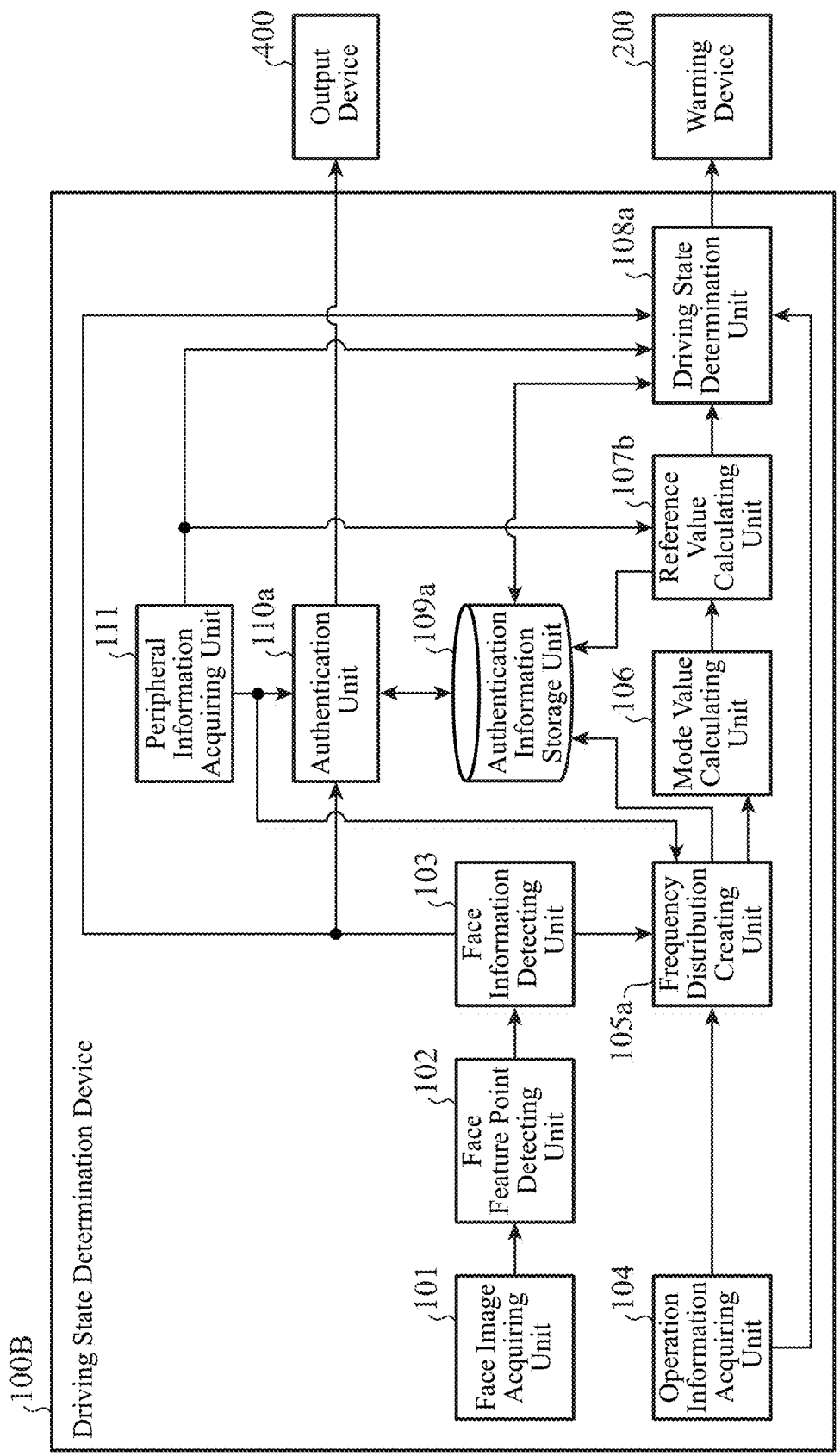
FIG. 15 is a block diagram illustrating a configuration of a driving state determination device according to a third embodiment.

FIG. 15 is a block diagram illustrating a configuration of a driving state determination device 100B according to the third embodiment.

The driving state determination device 100B according to the third embodiment has a configuration in which a peripheral information acquiring unit 111 is added to the driving state determination device 100A of the second embodiment illustrated in FIG. 13. In addition, instead of the reference value calculating unit 107a, the driving state determination unit 108, the authentication information storage unit 109, and the authentication unit 110, a reference value calculating unit 107b, a driving state determination unit 108a, an authentication information storage unit 109a, and an authentication unit 110a are included.

Hereinafter, the same components or corresponding portions as those of the driving state determination device 100A according to the second embodiment are denoted by the same reference numerals as those used in the second embodiment, and the description thereof will be omitted or simplified.

The peripheral information acquiring unit 111 acquires current weather information, date and time information, traffic information (hereinafter referred to as "vehicle peripheral information") input from an external device (not illustrated), and the peripheral information acquiring unit 111 outputs the vehicle peripheral information acquired to the reference value calculating unit 107b, the driving state determination unit 108a, and the authentication unit 110a. The reference value calculating unit 107b stores the reference value calculated in the authentication information storage unit 109a in association with the identification information of the driver and the vehicle peripheral information when calculating the reference value. The authentication information storage unit 109a is a region for storing the reference value calculated by the reference value calculating unit 107b, the identification information of the driver, and the vehicle peripheral information in association with each other.

The authentication unit 110a acquires current vehicle peripheral information input from the peripheral information acquiring unit 111. The authentication unit 110a collates the reference value to which the vehicle peripheral information matching or similar to the acquired vehicle peripheral information is associated, with the face information detected by the face information detecting unit 103. The authentication unit 110a performs authentication of the driver with reference to the identification information of the driver associated with the reference value matching the face information. When the authentication of the driver is successful as in the second embodiment, the authentication unit 110a instructs the driving state determination unit 108a to start determination of the driving state, and outputs the information indicating that the authentication of the driver is successful, to the output device 400. In addition, when the authentication of the driver is unsuccessful, the authentication unit 110a outputs information indicating that the authentication is unsuccessful, for example, to the output device 400.

The authentication information storage unit 109a stores the reference value in association with the current weather information and the date and time information, whereby authentication can be performed, in the authentication unit 110a, in consideration of a change in light occurring in a captured image of the driver due to the weather or the date and time.

In addition, the authentication information storage unit 109a stores the reference value in association with the traffic information, whereby authentication can be performed, in the authentication unit 110a, in consideration of changes in facial expression or the like occurring in the captured image of the driver due to a road congestion degree.

The driving state determination unit 108a determines the driving state of the driver by comparing the reference value associated with the vehicle peripheral information matching or similar to the vehicle peripheral information acquired, with the face information of the driver input from the face information detecting unit 103. The driving state determination unit 108a determines the driving state by using the reference value in consideration of the vehicle peripheral information input from the peripheral information acquiring unit 111, thereby being able to determine the driving state in consideration of the change of the light or the change in the facial expression occurring in the captured image of the driver.

Note that, the driving state determination unit 108a may determine the driving state of the driver by comparing the reference value input from the reference value calculating unit 107b with the face information of the driver input from the face information detecting unit 103, as in the first embodiment.

Next, a hardware configuration example will be described of the driving state determination device 100B. Note that, the description of the same configuration as that of the first embodiment will be omitted.

The reference value calculating unit 107b, the driving state determination unit 108a, the authentication unit 110a, and the peripheral information acquiring unit 111 in the driving state determination device 100B are the processing circuit 100a illustrated in FIG. 2A or the processor 100b for executing a program stored in the memory 100c illustrated in FIG. 2B.

Next, operation will be described of the authentication of the driver by the driving state determination device 100B.

Figure 16:
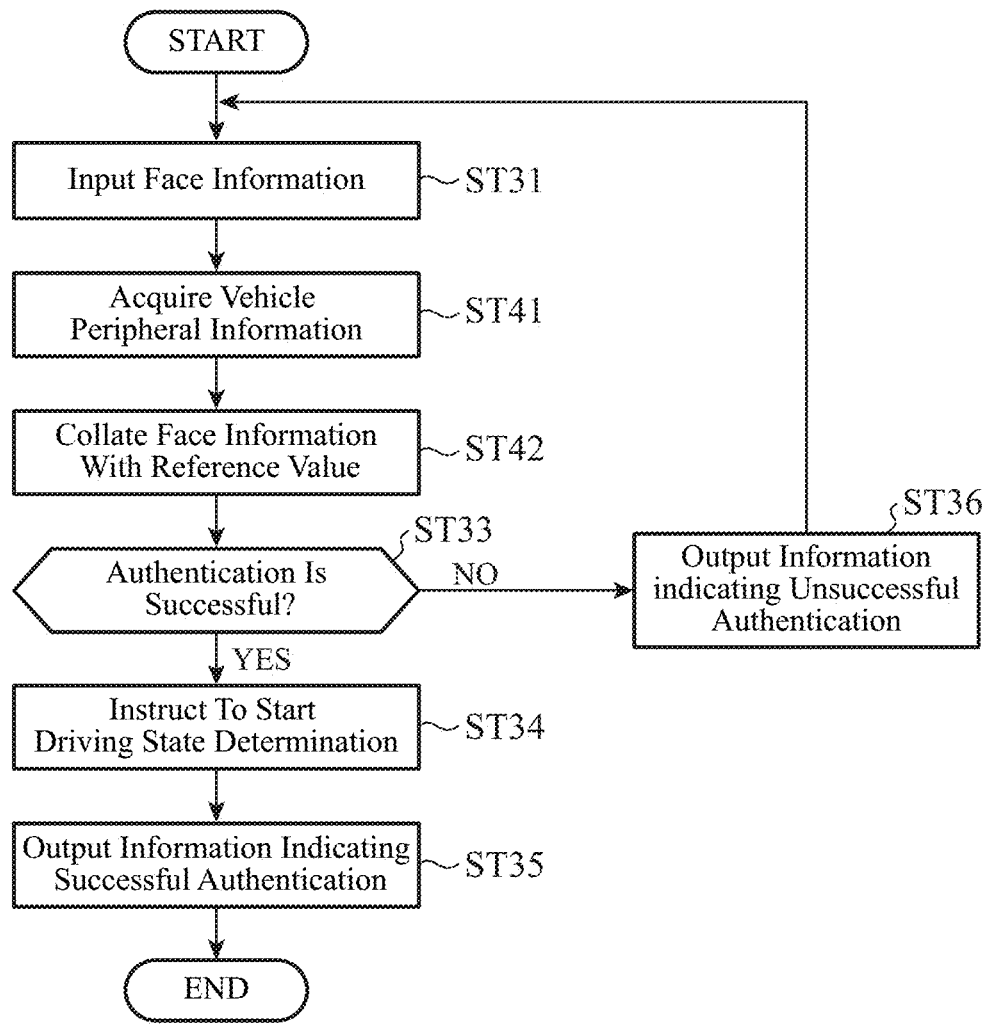
FIG. 16 is a flowchart illustrating operation of an authentication unit of the driving state determination device according to the third embodiment.

FIG. 16 is a flowchart illustrating operation of the authentication unit 110a of the driving state determination device 100B according to the third embodiment. The operation of the authentication of the driver illustrated in FIG. 16 is performed when the driver gets into the vehicle, for example, when the driver sits in the driver's seat. Note that, hereinafter, the same steps as those of the driving state determination device 100A according to the second embodiment are denoted by the same reference numerals as those used in FIG. 14, and the description thereof will be omitted or simplified.

When the face information is input from the face information detecting unit 103 (step ST31), the authentication unit 110a acquires the vehicle peripheral information from the peripheral information acquiring unit 111 (step ST41). The authentication unit 110a collates the reference value associated with the vehicle peripheral information matching or similar to the vehicle peripheral information acquired in step ST41 out of reference values stored in the authentication information storage unit 109, with the face information input (step ST42). Thereafter, the processing proceeds to step ST33.

As described above, according to the third embodiment, there is included the peripheral information acquiring unit 111 for acquiring environmental information around the vehicle, and the authentication information storage unit 109a stores the reference value calculated by the reference value calculating unit 107b in association with the identification information of the driver and the environmental information acquired, so that the driver can be authenticated and the driving state can be determined in consideration of the environment around the vehicle. Thus, decrease can be alleviated in the accuracy of an authentication result due to influence of the environment around the vehicle.

Some of the functions of the configurations described in the first to third embodiments described above may be performed by a server device connected to the driving state determination devices 100, 100A, and 100B. In addition, some of the functions of the configurations of the driving state determination devices 100, 100A, and 100B described in the first to third embodiments described above may be executed by a mobile terminal such as a smartphone of an occupant.

Besides the above, in the present invention, within the scope of the invention, free combination of each embodiment, a modification of an arbitrary component of each embodiment, or omission of an arbitrary component of each embodiment is possible.

INDUSTRIAL APPLICABILITY

The driving state determination device according to the present invention is suitable for being used in a driver monitoring system or the like in which improvement of determination accuracy is required, and determining the driving state or the like on the basis of the normal range set for each driver.

REFERENCE SIGNS LIST 100, 100A, 100B: Driving state determination device, 101: Face image acquiring unit, 102: Face feature point detecting unit, 103: Face information detecting unit, 104: Operation information acquiring unit, 105, 105a: Frequency distribution creating unit, 106: Mode value calculating unit, 107, 107a, 107b: Reference value calculating unit, 108, 108a: Driving state determination unit, 109, 109a: Authentication information storage unit, 110, 110a: Authentication unit, 111: Peripheral information acquiring unit

The invention claimed is:

1. A driving state determination device comprising:
a processor; and
a memory storing instructions which, when executed by the processor, causes the processor to perform processes of:
detecting, from a face image of a driver, position information about feature points of the driver's face as face feature points;
detecting face information indicating a state of the driver's face from the detected face feature points;
referring to the detected face information, and, creating a frequency distribution of the face information in a preset time section from the detected face information;
calculating a mode value of the face information from the created frequency distribution;
calculating a reference value indicating a steady state of the driver from the mode value of the calculated face information; and
determining a driving state of the driver by comparing the calculated reference value with the detected face information.

2. The driving state determination device according to claim 1, wherein the processes further comprise: acquiring vehicle operation information indicating an operation state of a vehicle on which the driver boards, and
wherein the processor refers to the acquired vehicle operation information, and when a preset vehicle operation is performed on the vehicle, creates the frequency distribution.

3. The driving state determination device according to claim 1,
wherein the processor detects a position of a face region of the driver from the detected face feature points, and
the processor creates the frequency distribution when the position of the face region is within an effective face position region set as a region in which the face region is positioned when the driver is seated.

4. The driving state determination device according to claim 1,
wherein the processor creates the frequency distribution when a difference between the detected face information at a certain point of time and the face information detected at a preceding timing immediately before the certain point of time is within a certain range.

5. The driving state determination device according to claim 1, wherein the processor creates the frequency distribution when the processor detects attachment/detachment of a wearing object to the driver's face or misalignment of the wearing object.

6. The driving state determination device according to claim 1,
wherein the processor creates the frequency distribution when the processor detects occurrence on contrast of the driver's face.

7. The driving state determination device according to claim 2,
wherein the processor creates the frequency distribution when the processor acquires information indicating at least one of opening/closing operation of a door of the vehicle, attachment/detachment operation of a seat belt of the vehicle, seating on a seat of the vehicle, change operation of a seat position of the vehicle, or shift operation of a shift lever of the vehicle to a drive position.

8. The driving state determination device according to claim 1,
wherein the face processor detects, as the face information, at least one of information indicating a positional relationship between the face feature points, an opening/closing state of the driver's eye, a line of sight of the driver, a face orientation of the driver, an oblateness of the driver's eye, a visually-recognizing range of the driver, or a visually-recognizing area of the driver.

9. The driving state determination device according to claim 1,
wherein the processor sets a normal visually-recognizing range of the driver on a basis of the reference value.

10. The driving state determination device according to claim 9,
wherein the processor changes the normal visually-recognizing range depending on an automatic driving level when a vehicle on which the driver boards has a manual driving mode in which the driver manually drives and an automatic driving mode in which driving control is automatically performed on a vehicle side, and the automatic driving mode includes a plurality of the driving levels.

11. The driving state determination device according to claim 10,
wherein the processor widens the normal visually-recognizing range as the automatic driving level comes close to a fully automated driving.

12. The driving state determination device according to claim 9,
wherein the processes further comprise: acquiring vehicle operation information indicating an operation state of a vehicle on which the driver boards,
the processor refers to the acquired vehicle operation information, and when a preset vehicle operation is performed on the vehicle, creates the frequency distribution, and
the processor predicts a turning direction of the vehicle with reference to inputted steering angle information, and corrects a direction of the normal visually-recognizing range.

13. The driving state determination device according to claim 9,
wherein the processes further comprise: acquiring vehicle operation information indicating an operation state of a vehicle on which the driver boards, and
wherein the processor refers to the acquired vehicle operation information, and when a preset vehicle operation is performed on the vehicle, creates the frequency distribution, and the processor refers to inputted vehicle speed information and corrects a spread angle of the normal visually-recognizing range in accordance with a vehicle speed of the vehicle.

14. A determination device comprising:
a processor; and
a memory storing instructions which, when executed by the processor, causes the processor to perform processes of:
detecting, from a face image of a driver, position information about feature points of the driver's face as face feature points;
detecting face information indicating a state of the driver's face from the detected face feature points;
referring to the detected face information and creating a frequency distribution of the face information in a preset time section from the detected face information;
calculating a mode value of the face information from the created frequency distribution;
calculating a reference value indicating a steady state of the driver from the mode value of the calculated face information;
storing the calculated reference value in association with identification information of the driver; and
performing authentication of the driver by collating the acquired face information with the stored reference value.

15. The determination device according to claim 14, wherein the processor updates the stored reference value on a basis of changes in the feature points of the driver's face calculated, when the processor detects, as the face information, attachment/detachment of a wearing object to the driver's face or misalignment of the wearing object, or occurrence on contrast of the driver's face.

16. The determination device according to claim 14, wherein the processes further comprise: determining the driving state of the driver by comparing the stored reference value in a case that the processor completes authentication of the driver, with the detected face information.

17. The determination device according to claim 14, wherein the processes further comprise: acquiring environmental information around a vehicle on which the driver boards,
wherein the processor stores the calculated reference value in association with the identification information of the driver and the acquired environmental information.

18. The driving state determination device according to claim 17,
wherein the processor acquires at least one of weather information, date and time information, or traffic information around the vehicle.

19. A driving state determination method comprising:
detecting position information about feature points of a driver's face as face feature points from a face image of the driver;
detecting face information indicating a state of the driver's face from the face feature points;
referring to the face information, and when a preset change occurs in the driver's face, creating a frequency distribution of the face information in a preset time section from the face information;
calculating a mode value of the face information from the frequency distribution;
calculating a reference value indicating a steady state of the driver from the mode value of the face information; and
determining a driving state of the driver by comparing the reference value with the face information.

* * * * *